Jan. 21, 1936.  C. E. JOHANSSON  2,028,611
PRECISION MEASURING INSTRUMENT
Filed April 29, 1931   3 Sheets-Sheet 3

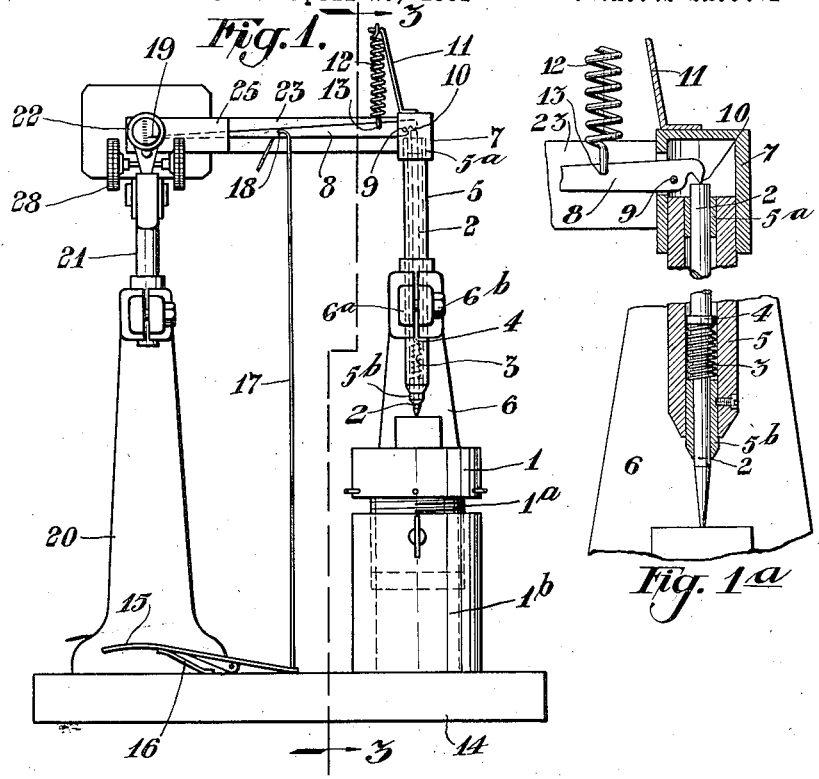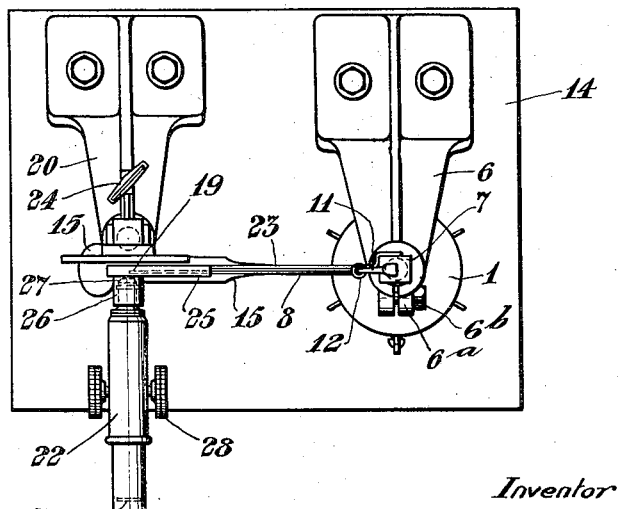

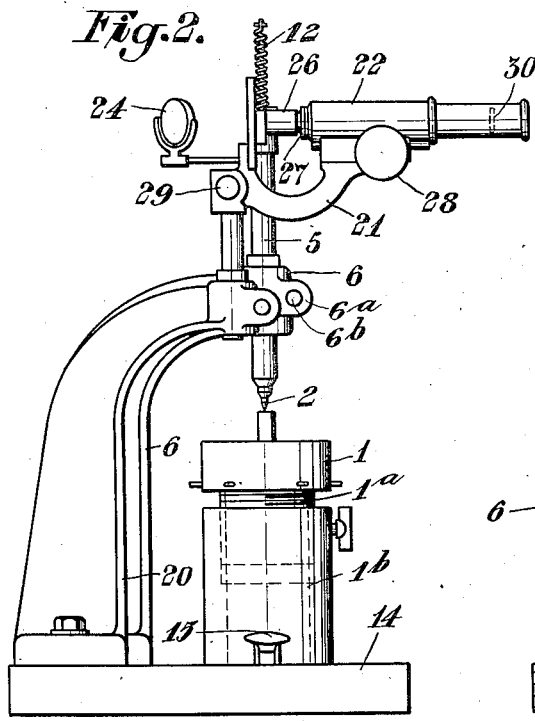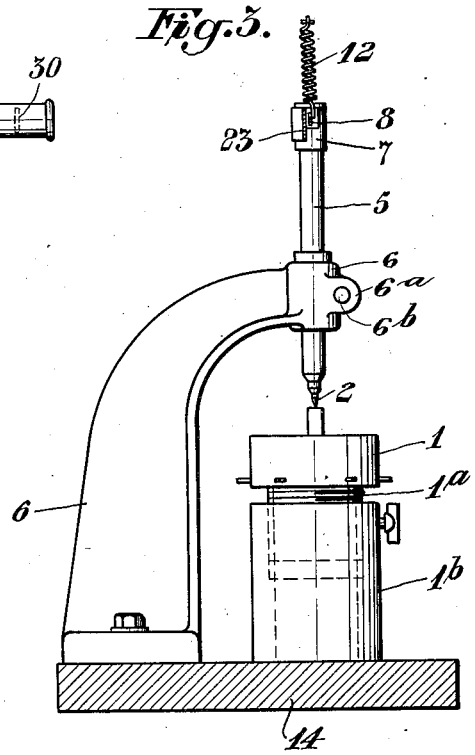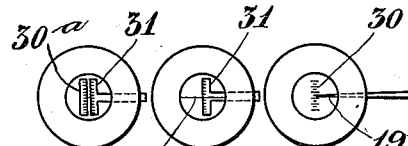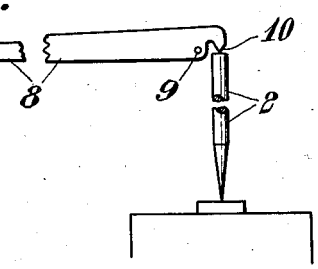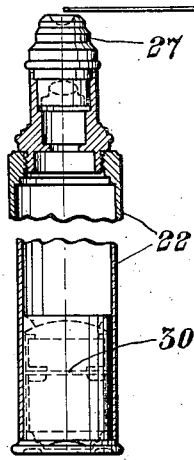

Inventor:
Carl Edvard Johansson
by Joseph Farley
C. R. Davis
Attorneys.

Patented Jan. 21, 1936

2,028,611

UNITED STATES PATENT OFFICE 2,028,611

PRECISION MEASURING INSTRUMENT

Carl Edvard Johansson, Detroit, Mich.

Application April 29, 1931, Serial No. 533,756

16 Claims. (Cl. 33—147)

The present invention relates to a precision measuring instrument for measuring certain dimensions, such as thickness or length, of bodies which in respect of such dimensions should agree as closely as possible with a standard measure. The instrument in question is provided with a measuring support on which the bodies to be measured may be placed, and with a measuring plunger movable relatively to said support, the movements of which, relatively to the measuring support, are transmitted to the shorter arm of a pivoted lever, or lever mechanism, so that the end of the longer lever arm or pointer reproduces the movements of the measuring plunger on an enlarged scale.

The invention is principally characterized by the provision of a microscope associated with the instrument in such position with relation to the end of the longer lever arm, or pointer, that the movements, or positions of rest, of said pointer may be observed and read off in the microscope on a further magnified scale. To that end the microscope is provided with a transparent micrometer, located in the field of view produced by the objective of the microscope, and serving as a scale for determining the movements of the longer lever arm. This arrangement renders it possible to effect the most precise measurements.

The present invention also provides means for controlling the movement of the measuring plunger towards the objects to be measured in such manner that the bearing pressure of said plunger against such objects shall always be the same, and thus avoid errors in the readings.

Together with these general ideas, my invention consists in the arrangement, construction and combination of the various parts of my improved device as described in the specification, claimed in the claims, and described in the accompanying drawings, in which:

Figure 1 shows a front view of an instrument made according to my invention.

Figure 1A shows a vertical enlarged transverse sectional detail view through a portion of my improved device.

Figure 2 is a side view of the device shown in Figure 1.

Figure 3 is a vertical section taken on the lines 3—3 of Figure 1.

Figure 4 is a top or plan view of the instrument.

Figures 5, 6, 7, and 8 show details of the device diagrammatically.

Figure 9:
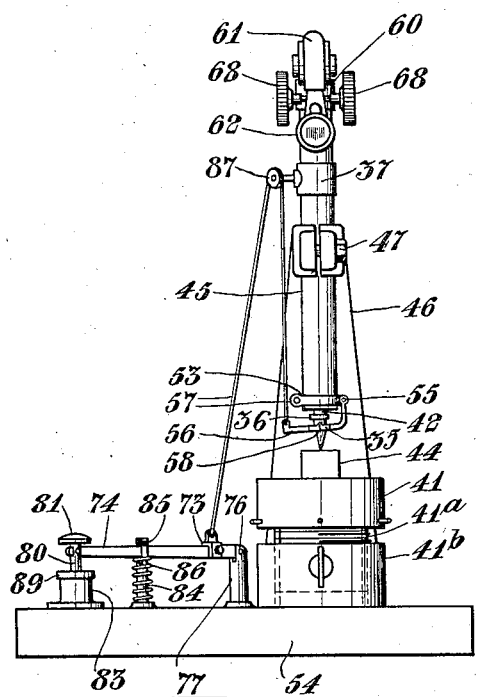

Figure 9 shows a front view of a modified construction of an instrument made according to my invention.

Figure 10:
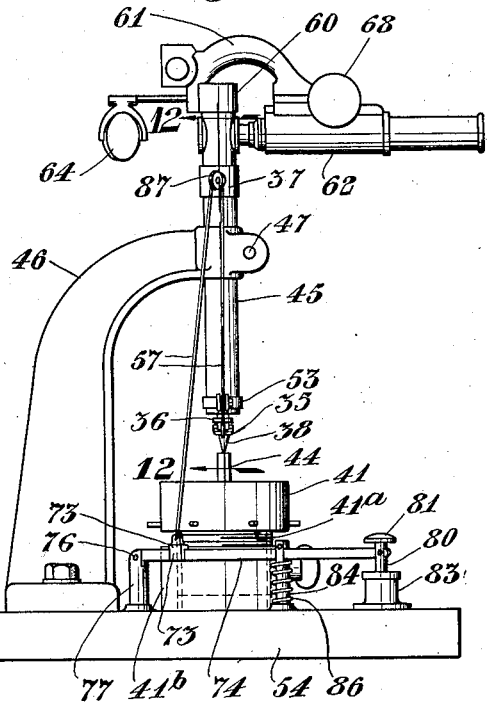

Figure 10 is a side view of this instrument.

Figure 11:
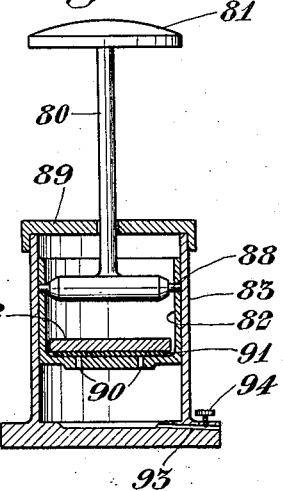
Figure 12:
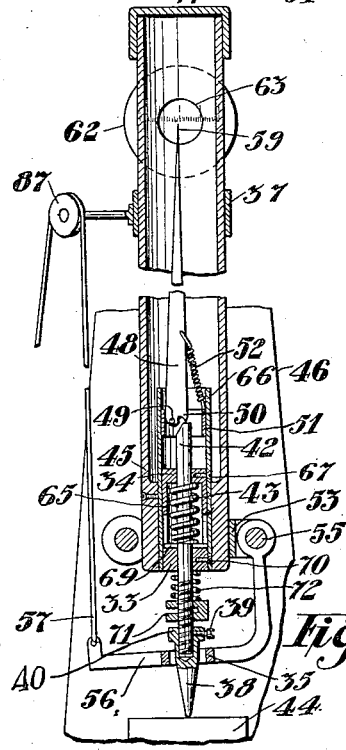

Figure 11 shows on an enlarged scale the brake device which serves to control the speed at which the measuring plunger moves against the object to be measured, and Figure 12 is an enlarged vertical sectional view which illustrates the internal mechanism of the instrument shown in Figs. 9 to 11 and includes an addition thereto for adjustably regulating the pressure of the plunger.

Referring to Figures 1 to 8 inclusive, I denotes the measuring support, the upper surface of which may be raised and lowered as desired by turning the screw-threaded spindle $1^a$, which is rigidly connected to the support, in a corresponding stationary nut $1^b$, said surface being as true as possible so that all points of the same lie in the same horizontal plane. On said surface the body is placed which it is desired to examine.

Arranged over the measuring support is a measuring plunger 2 which is normally held raised from the support by the weak coil spring 3 which bears against the shoulder 4. The measuring plunger is surrounded by a sleeve 5 which has fixed bushings $5^a$ and $5^b$, at the ends, through the central apertures in which bushings the measuring plunger slides, the lower bushing also serving as a support for the coil spring 3. The sleeve 5 is supported by a bracket 6 the upper end of which $6^a$ is split, so that said end may be clamped around the sleeve 5 by means of a stud $6^b$, as shown in Figures 1 to 4 inclusive.

The sleeve 5 is provided at its upper end with a head 7 in which a lever 8 with unequal arms is pivoted on the fulcrum pin 9. The shorter arm of the lever 8 is formed as a knife edge 10 directed downwards and against which the upper end surface of the plunger 2, which is accurately planed and exactly perpendicular to the axis of the plunger 2, is forced by the coil spring 3. Secured to the head 7 is an arm 11 which supports a coil spring 12 which is attached at 13 to the lever 8, and which tends to turn the longer lever arm upwards, and thus to move the measuring plunger 2 downwards against the support 1. For this purpose the spring 12 is stronger than the spring 3. Turning movement of the lever 8 is normally prevented, however, by a lever or key 15 pivoted to the base plate 14, the shorter end of which lever is held against the base plate by a strong leaf spring 16 and is connected by means of a flexible wire 17 with the lever 8 at 18.

Only when the longer arm of the lever or key 15 is pushed down against the base plate, so that the wire 17 slackens, can the coil spring 12 swing the longer arm of the lever 8 upwards. The coil spring 12 is so dimensioned that it overcomes the pressure of the coil spring 3, which holds the measuring plunger 2 raised against the knife edge 10, so that the measuring plunger 2 will be forced down.

The outermost end of the longer arm of the lever 8 is formed with as sharp a point 19 as possible, which reproduces the movements of the measuring plunger 2, as will be understood from the above description, on an enlarged scale dependent on the ratio between the lengths of the two arms of the lever 8.

A further magnification is obtained, according to my invention, by the aid of the following optical means. Secured to the bottom plate 14 is a second bracket 20 supporting at its upper split end a carrier 21 for a microscope 22. The brackets 6 and 20, and associated parts, have such mutual positions that the point 19 moves in the vicinity of the optical axis of the microscope. Secured to the head 7 behind the lever 8 is an arm 23 provided with a hole opposite the point 19, so that light can be thrown on said point by means of an adjustable mirror 24 provided behind the arm 23.

Provided on the front side of the arm 23 is a box-shaped cover 25 for the point 19, and on the front side of said cover a short tube 26 is secured, all of which serves to protect the point 19 and the objective 27, which projects into the tube 26, from being illuminated from the front side. The objective is adjusted at a suitable distance from the point 19 by means of the usual adjustment device in microscopes of which the two knurled wheels 28 are shown in Figures 1, 2, and 4, and the hinge joint 29 in Figure 2.

Assuming that the objective 27 is correctly adjusted, so that the pointer 19 moves in a plane located within the double focal distance of the objective but outside the focal distance of the same, the inverted image of the pointer 19 falls within the focal distance of the ocular, and the movement of the point may be observed through the ocular magnified so many times relatively to the actual movement as corresponds to the product of the magnifications of the objective and of the ocular. Owing to the provision of a so-called ocular micrometer 30, (Figure 8) between the collective lens of the ocular and eye-lens of the ocular in the field of view formed by the objective of the pointer 19, the movement of the pointer may be observed as well as the graduations on the glass micrometer, both in focus in the same plane, and a measure of the actual magnitude of the movement may thus be obtained.

It is also possible to provide a small scale 31 on the point of the pointer, as shown in Figure 6, which scale will be magnified through the ocular. In such case the micrometer in the ocular may suitably be graduated as at 30ª as a vernier to the scale on the pointer, (as illustrated in Figure 7) whereby a more precise reading may be had. It may also be satisfactory to provide only the hair-cross line 32, (illustrated in Figure 6) in the ocular by the aid of which the number of passed graduations on the scale 31 may be determined.

If now the movement of the point 19 has been determined by a reading on the scale which is observed through the ocular of the microscope, the corresponding movement of the measuring plunger 2 is obtained by dividing the actual movement of the pointer 19 with the figure which denotes the ratio between the arms of the lever 8 and the magnification thereby produced.

The instrument described is employed in the following manner: The standard measuring block and the pieces to be compared with the same, are placed on the measuring support 1, after which the standard measuring block is first placed below the measuring plunger. The key 15 is pressed down so that the measuring plunger 2 will come to rest against the measuring block, after which by turning the screw-threaded spindle 1ª of the measuring support, the pointer is adjusted on the zero point of the ocular scale. The key is then released and the standard measuring block is moved aside and replaced by one of the bodies to be examined in respect of correspondence with said block. If, when now the key is pressed down, the pointer points to the zero point of the ocular scale, then there is full correspondence with the standard measuring block, otherwise the number of graduations on the scale shows how great the difference is in one direction or the other.

While the location of the glass micrometer above described, namely in the plane of the image produced by the objective of the microscope, is believed to be the most suitable in practice as it will admit of the most accurate readings, it will be understood that it may also be possible to locate the glass micrometer in the microscope objective or in front of the objective of the microscope, in the latter case, preferably as closely as possible to the plane in which the point of the pointer moves, so that the objective produces an image of both the pointer point and the glass micrometer.

In the construction illustrated in Figures 9 to 12 inclusive, 41 denotes the measuring support the upper surface of which may be raised and lowered as desired by turning the screw-threaded spindle 41ª, which is rigidly connected to the support, in a corresponding stationary nut 41ᵇ, said surface being as true as possible so that all points of the same lie in the same horizontal plane. On said surface the body is placed which it is desired to measure. Provided over the measuring support is a measuring plunger 42 which is slidable in bushings 33 and 34 in the lower end of a sleeve 45 and is actuated by a relatively strong spring 43, which tends to move the measuring plunger 42 down towards the measuring support 41 or toward the body 44 to be measured. The sleeve 45 is supported by a bracket 46 secured to the base plate 54 of the instrument, the upper end of said bracket being split so that said end may be clamped around the sleeve 45 by means of a stud 47, as shown in Figures 9 and 10.

Located in the upper portion of the sleeve 45 is a bell crank lever 48, which has unequal arms, and which is pivoted on a fulcrum pin 49 which is inserted in a bushing 51 in the sleeve 45. The shorter arm of said lever 48 is formed as a knife edge 50 which is directed downwards, and bears against the upper accurately planed end surface of the plunger 42, said surface being exactly perpendicular to the axis of said plunger.

The lever 48 is moved to position to engage the knife edge 50 with the plunger by a relative light coil spring 52 the upper end of which is attached to said lever 48, and the lower end of which is attached to the sleeve 45 in such manner that said spring 52 tends to turn the longer lever arm of the lever 48 to the right in Figure 12, thus forcing the knife edge 50 against the upper plane end surface of the measuring plunger 42. The spring 52 holds the knife edge 50 constantly against the upper plane end surface of said measuring plunger 42.

The upper end of the longer arm of the lever 48 is formed as a sharp point 59 which reproduces the movements of the measuring plunger 42 on an enlarged scale. Secured to the upper end of the sleeve 45 is a cap or head 60, which carries an arm 61, which supports a microscope 62 in such position that the point 59 moves in the vicinity of the optical axis of the microscope. The sleeve 45 is apertured at 63 opposite the point 59, so that light can be thrown on said point by means of a mirror 64 provided on the side of the sleeve 45 remote from the microscope. The objective of the microscope may be adjusted at a suitable distance from the point 59 by means of the usual knurled wheels 68. Owing to the fact that the lever 48 is located within the sleeve 45, and that said sleeve supports the microscope 62, the advantage is gained that no special bracket is necessary for supporting the microscope, as in the construction described in Figures 1 to 8 inclusive.

Clamped to the lower end of the sleeve 45 is a split ring 53 to which a lever 56 is pivoted by means of a pivot pin 55, said lever having a ring 35 formed therein to surround the lower end of the measuring plunger 42 which is formed as a measuring point, but out of contact therewith. The ring 35 is provided on both sides of the measuring plunger 42 with upward directed knife edges 58 which are adapted to cooperate with a flange 36 formed on the measuring plunger 42. Attached to the free end of the lever 56 is one end of a flexible fabric thread 57 which runs over a pulley 87 which is mounted on a sleeve 37 fastened to the sleeve 45 near the top thereof. The other end of the thread 57 is attached to a clamp 73 which is adjustably secured to a lever 74, which is pivoted by means of a pivot pin 76 in a standard 77 secured to the base plate 54 of the instrument. The lever 74 is embraced by the upper fork-shaped end portion of a second standard 84 which is also secured to the base plate 54. A pin 85 traverses the shanks of said fork and limits the upward movement of the lever 74. A coil spring 86 is placed around the standard 84 and maintains the lever 74 normally bearing against the pin 85. The lever 74 is connected at its outer end with a push button 81, which is adapted to be pressed down by hand, and also with a brake device, hereinafter described, which serves to regulate the speed at which the measuring plunger 42 is lowered against the body 44 to be measured.

In this construction the thread 57 is normally slack, so that the lever 56 occupies such position that the knife edges 58 on the same normally do not or only lightly engage the collar on the measuring plunger 42.

The lever 74 is associated with a brake device or dash pot, which, after the measuring plunger 42 has been raised, only allows said plunger to move slowly and at a certain speed down against the body 44 to be measured.

In the construction illustrated said brake device consists of an air brake, which is shown on an enlarged scale in Figure 11, and which consists of a cylinder 83 in which a piston 82 is movable. Pivotally secured to said piston by means of a pin 88 is a piston rod 80, which projects upwards above the brake cylinder, and which is pivotally connected above the same with the above-mentioned lever 74 and supports at its upper end the push button 81. The cylinder 83 is provided at its bottom with a restricted aperture 93 through which the chamber below the piston 82 communicates with the outside air. The chamber above the piston 82 is in practically open communication with the outside air owing to the fact that the cover 89 which, as shown in Figure 10, covers the upper end of the cylinder 83, and which serves as a dust guard, is loosely placed on the cylinder. This piston 82 is provided with a hole or holes 90 therethrough, which are covered by a thin packing plate 91 of rubber or the like, on which a valve plate 92 of iron or other suitable material rests. The restricted aperture 93 may suitably be provided with a small choke screw 94 by means of which the area of the aperture may be regulated.

As above mentioned, the spring 86 normally maintains the lever 74 in engagement with the pin 85 in the standard 84, so that the piston 82 occupies its highest position in the cylinder 83. When the button 81 is pushed down with a finger, the piston 82 moves down in the cylinder 83, so that the air in the chamber below the piston 82 becomes compressed and flows out through the holes 90 in the piston, lifting the valve plate 92 and its packing plate 91 from the upper face of the piston. Simultaneously, the thread 57 is pulled so that the lever 56 lifts the measuring plunger 42, so that the body to be measured may be pushed in under the plunger. As soon as this has been done, the button 81 is released, so that the spring 86 begins to push the lever 74 upwards, thereby pulling the pump piston 82 upwards. The valve plate 92 immediately closes the holes 90 in the piston, so that air can flow into the chamber below the piston only through the restricted aperture 93. By suitable regulation of the area of flow of said aperture the result may thus be attained that the spring 86 can only pull the piston 82 upwards at the desired slow speed, and that thus the measuring plunger 42 will be lowered against the body 44 placed on the measuring support at a corresponding slow speed. In this way the measuring plunger will thus always be lowered at the same rate of speed independent of the operator performing the measuring, so that uniform measuring conditions are always secured.

Referring particularly to Figure 12 of the drawings, I have here shown an additional device for varying nicely the spring pressure used to return the plunger into contact with the work 44. In this construction, the plunger 42 is formed in two parts, the lower or contact point end thereof being detachably secured thereto. This contact point member 38 is secured to the lower end of the plunger 42 by the set screw 39. This point member 38 is also provided with a flange 40 which serves the same purpose as the flange 36, namely to be contacted by the knife edges 58 and the ring 35 to cause the plunger 42 to be lifted when the push button 81 is depressed.

In this construction, the upper bushing 34 is formed as the top of a cup member 65 which is fastened in a sleeve 66 by a set screw 67. This cup 65 has the lower portion thereof provided with registering slots designed to receive a pin 69 which extends through the plunger 42 and performs the double function of preventing the plunger 42 from rotating and also forming a stop to limit the downward movement of this plunger caused by the spring 43 by the contact of said pin 69 with the bushing 33. It will be noted that this bushing 33 shown in Figure 12 is similarly secured in the sleeve 66 by a set screw 70.

The lower end of the plunger 42 is threaded so that a self-locking nut 71 may be screwed thereon to a position above the point member 38. Between the nut 71 and the bushing 33, a light spring 72 is disposed in position to embrace the plunger 42. This spring 72 supplements the action of the spring 43 and due to the nut 71, this supplementary action may be very nicely adapted to secure exactly the right contact between the point 38 and the work 44 being tested.

In order to provide ample bearing surfaces on the lower end of the plunger 42 the screw threads provided thereon are not of the standard type, but the thread is in the form of a helical groove, the convolutions of the groove being separated by smooth surfaces of much greater width than the width of the top of the usual screw thread. In other words the thread may be considered as a single spiral of a double or triple thread in which but one spiral groove is formed and the others omitted.

The arrangement of the pair of springs 43 and 72 in which the spring 72 is a weaker spring than the spring 43 permits of a very accurate and precise adjustment of the total spring pressure with which the plunger 42 is forced against the body to be measured. Any desired differential between the springs 72 and 43 may be employed. If, for example, the spring 43 is arranged normally to exert a pressure of, say, 4 ounces, and the spring 72, a pressure of 2 ounces, it will be readily understood that adjustment of the total spring pressure exerted on the plunger can be secured by rotation of the nut 71 in the proper direction and that a much larger degree of rotation of said nut will be required to produce a given change in the total spring pressure than would be needed if adjustment were provided for only a single spring, the pressure of which approximated more nearly the total pressure desired. It will thus be seen that the provision of the two springs 43 and 72, with one spring weaker than the other, and adjusting means provided for the weaker spring, provides, in effect, an unequal primary and secondary pressure means may be termed, an adjustable, differential pressure regulating mechanism.

It will be understood that this machine for which this application for patent is filed, is designed to be used in connection with the comparative measurements of blocks which are used as master gauge block sets or measuring blocks, and that the measurements secured by this instrument must be accurate to a matter of millionths of an inch. The pressure with which the point of a plunger bears against the block being measured, as well as the momentum of this plunger at the instant of contact are both extremely important features which must be very nicely adjusted and held absolutely uniform to secure the necessary fine accuracy of measurement which must be secured from this instrument. For instance, at one time it was thought that the necessary adjustment could be secured by tying a small bag of weights, such as shot, to the flexible member 57 to secure this necessary adjustment, and it was found that the mere swinging back and forth of this bag would cause a variation of the measuring results.

From the foregoing it will be seen that means are provided to hold the force of the impact and contact between the plunger and the work to within very fine limits.

The difference in length between the arms of the pointer lever 48 is preferably such that the movement of the pointer end 59 is greater than the movement of the knife-edge end 50 by an amount which is a multiple of ten enabling the observations made to be readily calculated. Likewise, the magnifying of the movement of the pointer 59 as observed through the microscope 62 is also preferably based upon the ten multiple principle. By employing different sets of oculars and objectives it therefore becomes possible to make observations within any desired degree of fineness. For example, if measurements are to be made, or comparisons to be effected, between a standard block and a block to be measured in which accuracy within, for example, one ten thousandth of an inch is required, a definite ocular and eye piece with a corresponding scale therefor will be employed in the microscope, whereas if measurements within a few millionths of an inch are required a different ocular, objective and scale will be employed. The machine therefore in its entirety includes in addition to what may be termed the fixed parts thereof a complete set of oculars and objectives which may be inserted in the microscope in different combinations to magnify the movement of the pointer in accordance with the degree of precision desired in the measurement to be made.

Among the many advantages arising as the result of my improved device, it should first be pointed out that I am enabled to secure very fine measurements. Next, that this result is due to the fact that first a mechanical means is employed for magnifying the variation in the block up to a point where an optical magnification may be used to observe this variation. Next, means are provided for very accurately controlling the impact of the plunger against the work and the pressure therebetween comprising an elastic dashpot in combination with an adjustable spring pressure whereby this contact can be held to the necessary fine limits. Still a further advantage results from my improved device in that comparative measurements may be obtained between two blocks at a very rapid rate so that the device is adapted for a large production of accurately made blocks. This latter result is, to a considerable extent, dependent upon the fact that the measuring support is vertically adjustable so that this part can be adjusted to take care of varying sizes of blocks and then the plunger may be used to record or observe the finer measurements necessary in connection with such blocks. On account of this construction it is not necessary to move or in any way alter the position of the parts which record the fine measurements in connection with my improved instrument whereas the lower member may be set for any size article which it is desired to measure.

Some changes may be made in the construction, arrangement, and combination of the various parts of my improved device, and it is my intention to cover by my claims such changes as may reasonably be included within the scope thereof.

I claim as my invention:

1. In a precision measuring instrument, the combination of a measuring support, a measuring plunger movable relatively to said support, a lever mechanism having a short arm and a long arm, said long lever arm having a substantially vertical position, said plunger engaging said short arm so as to transmit its movements thereto, whereby said long arm will reproduce the movements of said plunger on an enlarged scale, a microscope located with its objective adjacent to the end of said long arm and a transparent scale in the ocular, whereby the movements of said end may be observed as well as the graduations on said scale, both in focus in the same plane, said micrometer-scale serving to determine the movements of said end.

2. In a precision measuring instrument, the combination of a measuring support, a measuring plunger movable relatively to said support, a lever having a short arm with a knife edge thereon, and a long arm, said plunger engaging said knife edge so as to transmit its movements to said short arm, whereby said long arm will reproduce the movements of said plunger on an enlarged scale, a spring actuating said lever in such direction as to tend to hold said knife edge against said plunger, a microscope located with its objective adjacent to the end of said long arm so that the movements of said end can be observed relative to a further magnified scale and said microscope having a transparent micrometer-scale located in the ocular in the field of view of said end produced by said objective, whereby the movements of said end may be observed as well as the graduations on the transparent micrometer-scale, both being in focus in the same plane.

3. A precision measuring instrument, comprising a base, a horizontal support thereon, a vertically movable contact member above said support, a housing for said contact member, a bracket on said base supporting said housing, a lever pivotally mounted on said housing co-operating with said contact member to give a magnified indication of the movement thereof, a microscope supported at right angles to the plane of movement of said lever with its objective near the indicating end of said lever, a mirror supported in axial alignment with said microscope and on the opposite side of said lever indicating end and a transparent scale in the ocular of said microscope and in the field of view of said lever indicating end.

4. In a precision measuring instrument, a plunger reciprocable into and out of contact with a body to be measured, spring means for urging said plunger into contact with such body, fluid pressure means adapted to limit the speed of such plunger when moving into contact with such an object, and an auxiliary adjustable spring means adapted to supplement the first mentioned spring means and to nicely control the action thereof.

5. In a precision measuring instrument, a support for an article to be measured, a plunger movable to and from said support to contact with said article and adjustable unequal primary and secondary pressure means for urging said plunger towards said article and holding said plunger in contact therewith with a predetermined pressure.

6. In a precision measuring instrument, a support for an article to be measured, a plunger movable toward and from said support, adjustable unequal primary and secondary pressure means for urging said plunger towards said article with a predetermined pressure, multiplying lever means including a pointer associated with said plunger, the pointer of said lever means having a greater movement than said plunger by an amount which is a multiple of ten, an optical measuring means including a reference scale for magnifying and measuring the movement of said plunger by an amount which is also a multiple of ten.

7. A precision measuring instrument comprising, a base, a coacting member movably mounted upon said base one end of which is adapted to bear against the work to be measured when said work is positioned upon said base and the other end of which is positioned so as to indicate the size of said work, means for urging said member against said work with a uniform predetermined force, a manually operated lever, and a connecting means connecting said lever and said member, so that manual actuation of said lever withdraws said member from the work being measured, said connecting means being a non-conductor of heat whereby the body temperature of the operator will not be transmitted to said coacting member.

8. A device, as claimed in claim 7 wherein said connecting means comprises a fabric thread.

9. A device, as claimed in claim 7, wherein means are provided for limiting the speed of the movement of said member towards the work being measured.

10. A device, as claimed in claim 7, wherein a dash pot is associated with said lever, the movement of the lever in one direction expelling the fluid from the dash pot while withdrawing the measuring member from the work, and the movement of the lever in the opposite direction being controlled by said dash pot so as to cause said member to strike the work at a constant speed, the lever and dash pot both being operatively connected with said member only by said non-conducting connecting means.

11. In a precision measuring instrument, the combination of a measuring support, a measuring plunger movable relative to said support, a lever having a short arm and a long arm, said long arm being disposed in a substantially vertical position, said plunger engaging said short arm so as to transmit its movements to said short arm, whereby said long arm will reproduce the movements of said plunger on an enlarged scale, a housing for said lever mechanism and said measuring plunger, a spring in said housing actuating said plunger in such direction as to tend to move said plunger against said support, means for lifting said plunger against the action of said spring, a brake device associated with said means for controlling the speed of motion of said plunger towards said support under the actuation of said spring, a microscope supported by said sleeve in such position relative to the end of said long lever arm that movement of said end can be observed upon an enlarged scale in the field of view produced by the objective of said microscope, said microscope having a transparent micrometer scale located in said field of view, whereby the movements of said end may be observed relative to the graduations on said transparent micrometer scale, both being in focus in the same plane, the micrometer scale serving as a scale for determining the movements of said long lever arm.

12. In a precision measuring instrument, the combination of a measuring support, a measuring plunger movable relatively to said support, a lever mechanism associated with said plunger to reproduce the movements of said plunger on an enlarged scale, said lever mechanism having an indicating end, a microscope, with a transparent micrometer-scale therein, the graduations of which have a definite relation to a given movement of said end and said scale being located in the field of view of said end produced by the objective of the microscope, whereby the movements of said end may be observed as well as the graduations on said transparent micrometer-scale, both being in focus in the same plane and direct multiplied reading obtained therefrom.

13. In a precision measuring instrument, the combination of a measuring support, a measuring plunger movable relatively to said support, a lever mechanism having a short arm and a long arm, said plunger being associated with said short arm so as to transmit its movements to said short arm, whereby said long arm will reproduce the movements of said plunger on an enlarged scale, a microscope with a transparent micrometer-scale therein, located in such position relatively to the end of said long arm that the movements thereof bear a definite relation to the magnified micrometer-scale and direct multiplied readings of the movements of said plunger being obtained by observations taken through said microscope.

14. In a precision measuring instrument, the combination of a measuring support, a measuring plunger movable relatively to said support, a lever mechanism having a short arm and a long arm having a scale on the end thereof, said plunger being associated with said short arm so as to transmit its movements to said short arm, whereby said long arm will reproduce the movements of said plunger on an enlarged scale, a microscope with a transparent micrometer-scale therein, located in such position relatively to the end of said long arm that the movements thereof may be observed relative to the magnified micrometer-scale, both being in focus in the same plane.

15. In a precision measuring instrument, the combination of a measuring support, a measuring plunger movable relatively to said support, a lever mechanism having a short arm and a long arm, having a scale on the end thereof, said plunger being associated with said short arm so as to transmit its movements to said short arm, whereby said long arm will reproduce the movements of said plunger on an enlarged scale, a microscope, with a transparent micrometer-scale therein, located in such position relatively to the end of said long arm that the movements thereof may be observed relative to the magnified micrometer-scale, the latter being located in the field of view of said end produced by the objective of the microscope, whereby the movements of said end may be observed as well as the graduations on said transparent micrometer-scale, both being in focus in the same plane, said scale on said end graduated in such manner relatively to said micrometer-scale that one of said scales forms a vernier to the other.

16. In a precision measuring instrument, the combination of a measuring support, a measuring plunger movable relatively to said support, a lever mechanism having a short arm and a long arm, said long arm having a substantially vertical position, said plunger engaging said short arm, whereby said long arm will reproduce the movements of said plunger on an enlarged scale, a sleeve surrounding said lever mechanism and said measuring plunger, a microscope, a transparent scale located in the ocular of said microscope, said microscope supported by said sleeve in such position relatively to the end of said long arm that the movements of said end can be observed relative to the graduations on said transparent scale, both being in focus in the same plane.

CARL EDVARD JOHANSSON.